(12) United States Patent
Miller

(10) Patent No.: US 6,497,293 B1
(45) Date of Patent: Dec. 24, 2002

(54) HORSESHOE

(76) Inventor: Gary M. Miller, 400 Eldridge Rd., Aurora, OH (US) 44202

( * ) Notice: Subject to any disclaimer, the term of this patent is extended or adjusted under 35 U.S.C. 154(b) by 0 days.

(21) Appl. No.: 09/883,606

(22) Filed: Jun. 18, 2001

(51) Int. Cl.$^7$ ................................................ A01L 1/00
(52) U.S. Cl. ........................................................ 168/24
(58) Field of Search ............................. 168/24, 4, 6, 7

(56) References Cited

U.S. PATENT DOCUMENTS

| | | | |
|---|---|---|---|
| 346,350 A | * | 7/1886 | Bingham |
| 374,727 A | * | 12/1887 | Bingham |
| 382,131 A | * | 4/1888 | Bingham |
| 427,976 A | * | 4/1890 | Curtin |
| 518,863 A | * | 4/1894 | Scribner |
| 526,034 A | * | 9/1894 | Hague |
| 526,049 A | * | 9/1894 | Poupard |
| 526,050 A | * | 9/1894 | Poupard |
| 561,217 A | | 6/1896 | Freyne |
| 872,191 A | | 11/1907 | Nagley |
| 985,249 A | * | 2/1911 | Butschko |
| 1,861,695 A | * | 6/1932 | Harsem |
| 1,946,636 A | | 2/1934 | Nygaard |
| 2,024,265 A | | 12/1935 | Anderson et al. |
| 2,094,743 A | | 10/1937 | Kearney |
| 2,157,826 A | | 5/1939 | Kearney |
| 3,050,133 A | | 8/1962 | Ketner et al. |
| 3,310,115 A | | 3/1967 | Ward |
| 3,425,493 A | * | 2/1969 | Kulak ........................... 168/4 |
| 3,469,631 A | | 9/1969 | Becker |
| 3,494,422 A | | 2/1970 | Clark |
| 4,513,824 A | | 4/1985 | Ford |
| 4,580,637 A | | 4/1986 | King |
| 5,048,614 A | | 9/1991 | Klimklo |
| 6,076,607 A | | 6/2000 | Bergeleen |
| 6,082,462 A | | 7/2000 | Lyden |

FOREIGN PATENT DOCUMENTS

| | | |
|---|---|---|
| FR | 2221073 | 10/1974 |
| GB | 1299836 | 12/1972 |
| GB | 2101463 | 1/1983 |
| GB | 2120072 A | 11/1983 |

* cited by examiner

Primary Examiner—Charles T. Jordan
Assistant Examiner—Bethany L Griles
(74) Attorney, Agent, or Firm—Hahn Loeser & Parks LLP; Michael H. Minns

(57) ABSTRACT

A horseshoe adapted to be compliant with the expansion and relaxation of the heel areas of a hoof of a horse in motion. The horseshoe consists of a toe area hingedly connected to two heel areas. In the preferred embodiment, the hinges are formed of a resilient material and are tapered from a wide end on the inside of the horseshoe to a narrow end on the outside of the horseshoe. Metal toe and heel inserts are provided as a wear surface for the horseshoe and the toe insert is sufficiently malleable to allow shaping of the horseshoe using typical blacksmithing equipment and tools.

29 Claims, 4 Drawing Sheets

Prior Art

HORSESHOE

BACKGROUND OF THE INVENTION

This invention relates generally to horseshoes and more particularly to a horseshoe which is compliant with the relative movements of the hoof of a horse.

Horseshoes have been used for centuries in order to protect the horse's foot and to enhance performance. Most horseshoes in use today are made of metal such as steel, aluminum alloys, and rarely, stainless steel or titanium. Aluminum alloys are most commonly used today in racing and are characterized by relatively low weight and expense. Horses engaged in training or racing are commonly reshod every four to five weeks. This is done in consideration for the wear incurred by the horseshoes, but also by the desire to maintain healthy geometry with respect to the configuration of the foot and so facilitate optimal biomechanics, or way of going.

The surfaces on which horses train and perform also vary widely. Horses frequently train and compete on grass, sand, cinder, crushed stone, and sometimes on packed surfaces which nearly approach the hardness of asphalt or cement. The hardness of the training or racing surfaces can greatly increase the effective rate of loading, thus the shock and vibration, e.g., the peak g forces which the horse will experience. Such will necessarily influence the nature of the waveform and the primary frequencies of shock and vibration transmitted to a horse's anatomy. These factors can directly affect a horse's efficiency, athletic performance and the amount of trauma that will be experienced.

While the characteristic biomechanics or way of going of horses can vary, e.g., as between Standardbreds and Thoroughbreds, or due to different gaits, such as running, jumping, walking, etc., what normally happens as a horse's foot and hoof impact the ground is that the back of the foot touches first, then the foot flattens and slides anteriorly skating across the surface. In particular, this is true of a horse's rear foot. Then the rear portion of the foot is loaded and deflection takes place. This will generally cause the foot to rotate backwards at the heel. The foot will then rotate forwards and recover to a relatively neutral position. Subsequently, the foot rapidly rotates forwardly and about a rocker point located between the geometric center of the foot and a short distance behind the anteriormnost area of the toe as the foot breaks over and toe-off takes place, thus ending the ground support phase and beginning the flight phase.

The heel of a horse's foot normally strikes the ground slightly before the toe, and this results in immediate heel expansion due to the action of the frog. As the frog is forced upward, the frog stay acts as a wedge in the digital cushion. This forces the digital cushion to expand, primarily in the outward direction because it is confined by structures of the foot in the dorsal, volar, and proximal directions. After the hoof is lifted from the running surface, the heel areas contract.

Furthermore, it is known that in the unshod natural state, a horse's foot and hoof will flex and slightly widen when it is loaded. The use of relatively rigid metal or aluminum horseshoe substantially prevents this natural movement and so tends to reduce both the effective size, and the shock and vibration absorbing capability of a horse's foot. A steel horseshoe is known to be more flexible in this regard than an aluminum or titanium horseshoe. It is believed that the occurrence of hoof cracks is sometimes caused by the flexing and widening action of the foot and hoof working against the nails associated with a substantially inflexible horseshoe.

One of the challenges encountered when attempting to reduce the rate of loading, and attenuate the shock and vibration experienced by a horse is posed by the fact that a horse is a rather large animal, e.g., commonly weighing between 800–1400 pounds, and when running at speeds between 30–40 miles per hour, a load exceeding 15,000 pounds can be placed upon a horse's leg. Accordingly, approximately 2600 pounds per square inch can be placed upon a typical horseshoe having roughly 6.5 square inches of working surface. When running on a hard race track, the entire duration of the impact event can be as short as 1.5 milliseconds, and over 350 peak g's can then be experienced.

The typical metal horseshoes restrict the natural expansion and contraction of the hoof of a horse in motion and can cause increased stress in the hoofs and legs of a horse in motion.

The foregoing illustrates limitations known to exist in present horseshoes. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a horseshoe having at least two hinges, a toe area, two heel areas and two quarter areas. The at least two hinges are positioned to allow expansion and relaxation of the horseshoe in compliance with the hoof of a horse in motion. Preferably, the hinges are positioned in the quarter areas of the horseshoe and have a tapered shape with the wide end of the taper being towards the interior of the horseshoe.

The foregoing and other aspects will become apparent from the following detailed description of the invention when considered in conjunction with the accompanying drawing figures.

BRIEF DESCRIPTION OF THE DRAWING FIGURES

DETAILED DESCRIPTION

Figure 1:
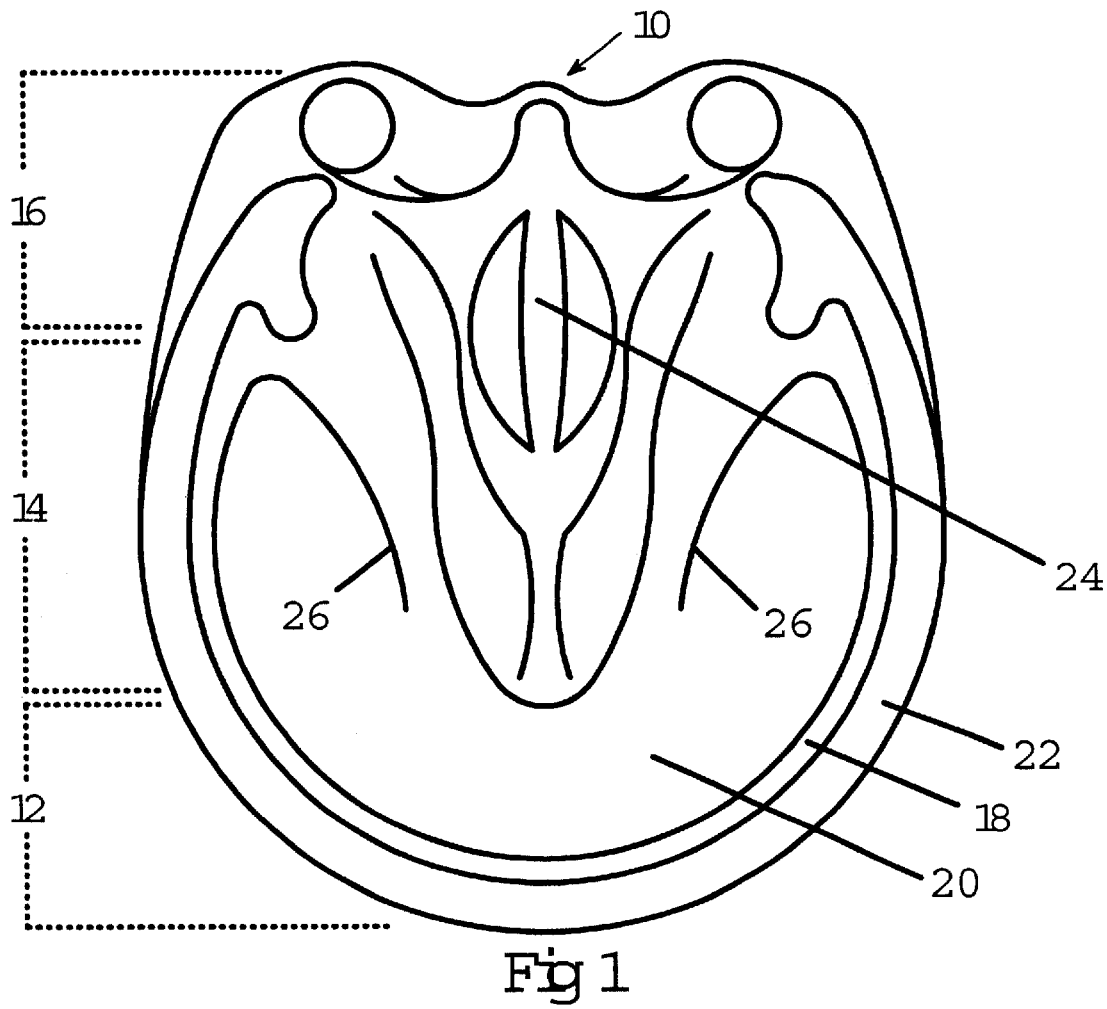
FIG. 1 is a bottom view of the hoof of a horse.

FIG. 1 shows a typical forefoot or hoof 10 of a horse. The hind foot is similar, however, the toe of the hind foot is more pointed than that of the forefoot. The hoof 10 is generally divided into 5 areas, a toe 12, quarters 14, heels 16, frog 24 and sole 20. The outermost portion of the hoof 10 is the wall 22. The wall 22 is normally thickest at the toe 12 and gradually thins towards the heels 16. The inside of the wall 22 should be slightly straighter than the outside. Inside the wall is the sole 20. Between the wall 22 and the sole 20 is the white line 18. At the heels 16, the wall 22 turns anteriorly to form the bars 26 that converge toward one another. The frog 24 is a wedge-shaped mass that occupies the angles bounded by the bars 26 and the sole 20. The wall 22, bars 26 and frog 24 are the weight-bearing structures of the hoof 10. The sole 20 should not bear weight except for a strip about ¼ inch wide, or less, inside of the white line 18.

Figure 2:
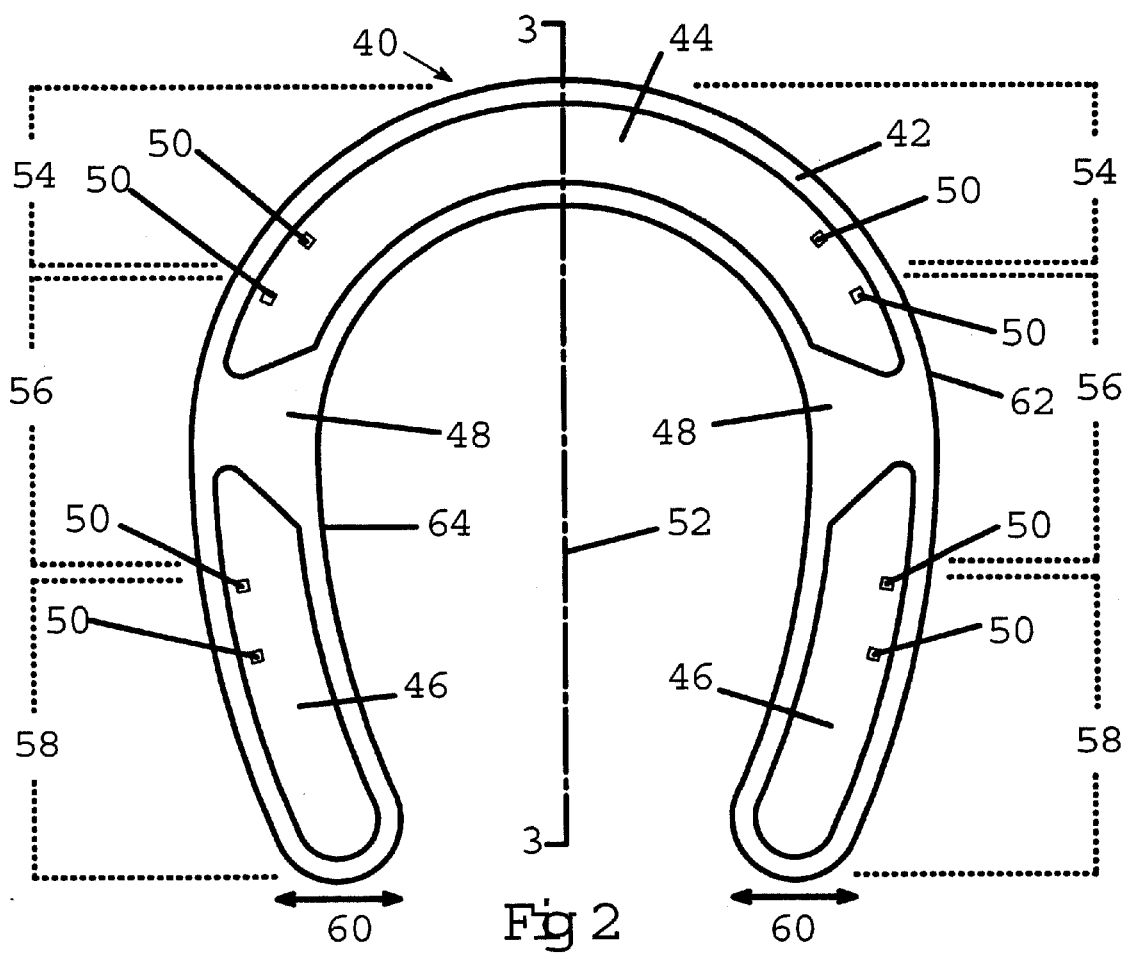
FIG. 2 is a bottom view of one embodiment of a horseshoe according to the present invention.
Figure 3:
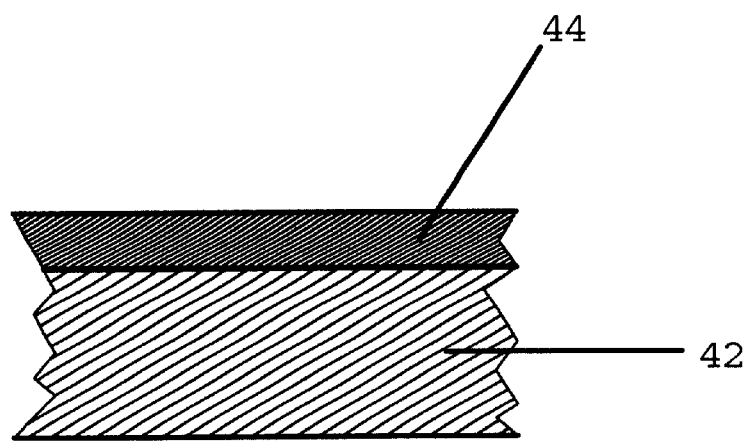
FIG. 3 is a cross-section of the horseshoe shown in FIG. 2, taken on line 3—3.
Figure 4:
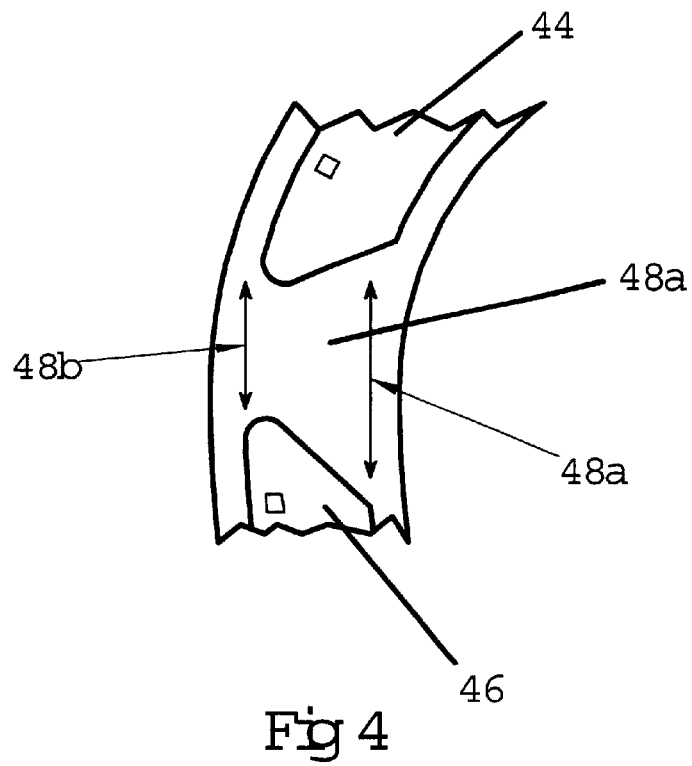
FIG. 4 is a partial enlarged view of the hinges of the horseshoe shown in FIG. 2.

The frog 24 is the foot pad of the horse and is the most elastic structure of the hoof 10. When the hoof 10 strikes the ground, the heels 16 expand, aiding in the distribution of concussion. The heel 16 normally lands slightly ahead of the toe 12, and this results in immediate heel expansion, indicated by arrows 60 in FIG. 2, due to the action of the frog 24. As the frog 24 is forced upward, the frog stay (the central spine of the frog 24) acts as a wedge in the digital cushion (a fibroelastic, fatty, pale yellow relatively avascular, and yielding pyramidal structure positioned above the frog 24 in the interior of the hoof 10). This forces the digital cushion to expand, primarily in an outward direction, because it is confined by structures of the hoof 10 in the dorsal, volar, and proximal directions. The frog stay coming up from below naturally limits distal expansion of the digital cushion. Natural expansion of the hoof creates blood flow to the foot and leg. Typical horseshoes formed from aluminum or steel, restrict expansion of the heel 16, resulting in increased stress in the hoof 10 and legs, particular during racing.

FIGS. 2 through 6 show a horseshoe 40 according to the present invention, where the horseshoe 40 has been configured to allow the expansion and relaxation of the hoof 10 of a horse in motion. In the preferred embodiment, the horseshoe 40 consists of a sole 42 formed from a resilient material, such as a polyurethane, natural rubber, synthetic rubber or a combination of two or more of such materials. Attached to the bottom surface of the sole 42 (the surface of the horseshoe which bears against the ground when nailed to a horse's hoof) of the horseshoe 40 are a toe insert 44 and two heel inserts 46. Two tapered hinges 48 are positioned between the toe insert 44 and the heel inserts 46. The horseshoe 40 is generally U-shaped with a centerline 52 bisecting the U-shape and is divided into five areas, a toe area 54, two-quarter areas 56 and two heel areas 58. Preferably, the hinges 48 are positioned in the quarter areas 56 and not in the toe area 54. A plurality of nail holes 50 are provided in the inserts 44, 46. Preferably, two nail holes 50 are provided in each heel insert 46 and four nail holes 50 are provided in the toe insert 44. In the preferred embodiment, the nail holes 50 in the toe insert 44 are located distal of a centerline 52.

The toe area 54 spans the centerline 52 and is proximate the centerline 52. The side of the horseshoe 40 on the outside of the hoof 10 is the lateral side 62; the side of the horseshoe on the inside of the hoof is the medial side 64.

The hinges 48 are preferably positioned in the quarter areas 56, between the toe insert 44 and the heel inserts 46, and are tapered from a wide end 48a on the inside edge of the horseshoe 40 to a narrow end 48b on the outside edge of the horseshoe 40 to provide the optimum expansion and contraction, along direction 60, in compliance with the hoof 10 of a horse in motion. The hinges 48 allow natural expansion and contraction of a shod hoof 10 of a running horse. The hinges 48 improve the ability of horseshoe 40 to adapt to uneven surfaces. The preferred ratio of the narrow end length 48b to the wide end length 48a ranges from about 0.4 to about 0.8. The hinges 48 are preferably formed entirely of the same resilient material as the sole 42.

The inserts 44, 46 are formed from materials, such as steel or aluminum, but preferably aluminum, which are sufficiently malleable to allow shaping of the horseshoe 40, particularly the toe shape, prior to being nailed to the hoof 10. The inserts 44, 46 can also provide a rigid wear surface and are therefore, preferably, attached to the sole 42 with no, or only a little, resilient material over the bottom surface of the inserts 44, 46. In one embodiment, shown in FIG. 2, the bottom of the horseshoe 40 has a smooth planar surface. In a second embodiment, shown in FIG. 5, additional traction features, such as a toe grab 72 or one or more cleats 74 can be provided. These traction features 72, 74 can be formed in the inserts 44, 46 or can be formed integral with the resilient material of the sole 42.

Preferably, only the resilient material of hinge 48 connects the adjacent areas of the horseshoe 40.

Figure 6:
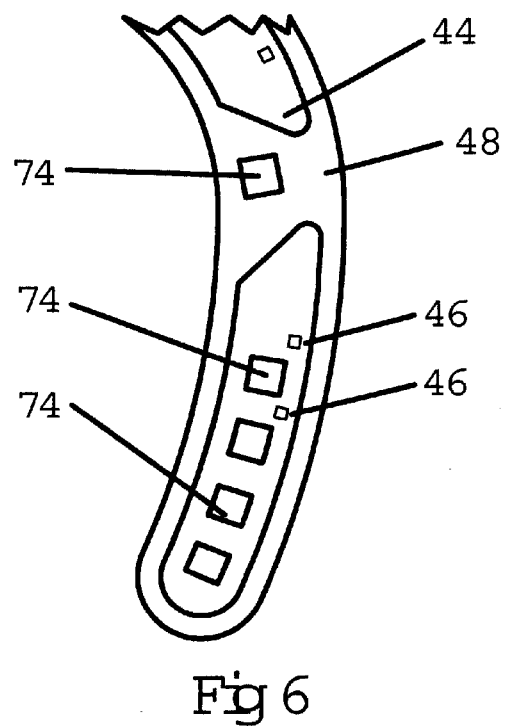
FIG. 6 is a partial bottom view of a third embodiment of a horseshoe according to the present invention.
Figure 5:
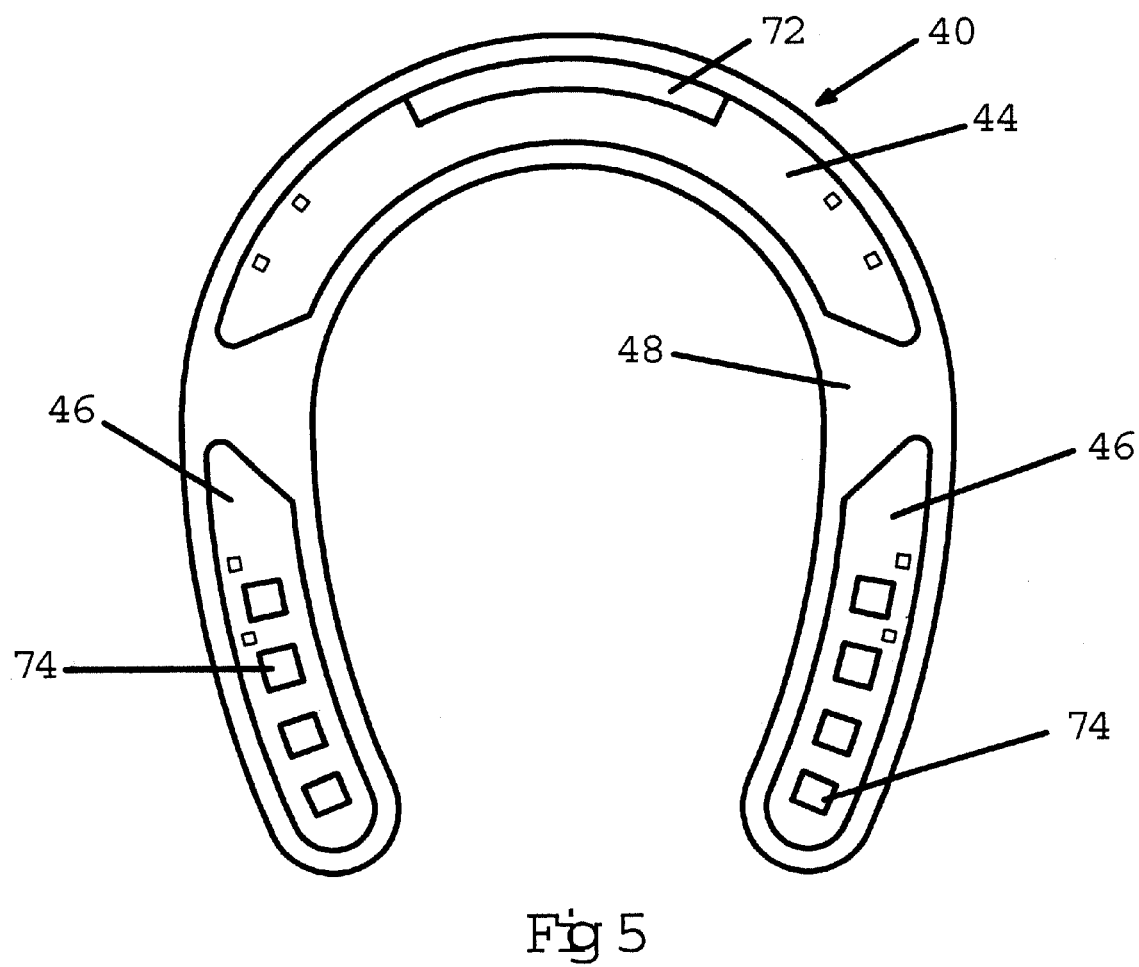
FIG. 5 is a bottom view of a second embodiment of a horseshoe according to the present invention.

FIG. 6 shows a third embodiment of horseshoe 40 similar to the embodiment shown in FIG. 5. One of the cleats 74 is positioned over and is integral with a hinge 48. This provides a thicker hinge 48 for those applications where the normal hinge thickness is not sufficient for the expected stresses.

What is claimed is:

1. A horseshoe comprising:
   at least two hinges, wherein each of said hinges comprises first and second hinge members and a non-metallic resilient material joining said first and second hinge members;
   said horseshoe having a substantially U-shape and a centerline bisecting said horseshoe, a toe area spanning said centerline and proximate to said centerline, two heel areas on opposite sides of said centerline and distal from said centerline, and two quarter areas on opposite sides of said centerline and intermediate to said toe area and said heel areas; said at least two hinges positioned to allow expansion and relaxation of said horseshoe in compliance with a hoof of a horse in motion.

2. The horseshoe of claim 1, wherein the hinges are positioned in the quarter areas of said horseshoe.

3. A horseshoe comprising:
   at least two hinges, wherein each of said hinges comprises first and second hinge members and a resilient material joining said first and second hinge members, said first and second hinge members form a tapered gap, said tapered gap tapering from a wide end to a narrow end, said resilient material substantially filling said tapered gap, wherein said narrow end has a narrow end length and is proximate to an outer edge of said horseshoe, and said wide end has a wide end length and is proximate to an inner edge of said horseshoe;
   said horseshoe having a substantially U-shape and a centerline bisecting said horseshoe, a toe area spanning said centerline and proximate to said centerline, two heel areas on opposite sides of said centerline and distal from said centerline, and two quarter areas on opposite sides of said centerline and intermediate to said toe area and said heel areas; said at least two hinges positioned to allow expansion and relaxation of said horseshoe in compliance with a hoof of a horse in motion.

4. The horseshoe of claim 3, wherein the ratio of said narrow end length to said wide end length ranges from about 0.4 to about 0.8.

5. The horseshoe of claim 3, wherein said resilient material comprises at least one member selected from the group consisting of polyurethanes, natural rubbers, and synthetic rubbers.

6. The horseshoe of claim 1, wherein said hinges comprise only a resilient material, said hinge resilient material being the only material connecting said toe member to said lateral side member and said medial side member.

7. A horseshoe comprising:
a toe member;
a lateral side member;
a medial side member; and
at least two hinges, wherein each of said hinges connecting said toe member to said lateral and medial side members comprises first and second hinge members and a resilient material joining said first and second hinge members; said medial side member comprising one first hinge member, said lateral side comprising the other first hinge member, and said toe member comprising two second hinge members, each pair of first and second hinge members form a tapered gap, said tapered gap tapering from a wide end to a narrow end, said resilient material substantially filling said tapered gap, wherein said narrow end has a narrow end length and is proximate to an outer edge of said horseshoe, and said wide end has a wide end length and is proximate to an inner edge of said horseshoe, one of said at least two hinges is positioned on the lateral side of said horseshoe and connects said lateral side member to said toe member, the other of said at least two hinges is positioned on the medial side of said horseshoe and connects said medial side member to said toe member;

said horseshoe having a substantially U-shape and a centerline bisecting said horseshoe, a toe area spanning said centerline and proximate to said centerline, two heel areas on opposite sides of said centerline and distal from said centerline, and two quarter areas on opposite sides of said centerline and intermediate to said toe area and said heel areas; said at least two hinges positioned to allow expansion and relaxation of said horseshoe in compliance with a hoof of a horse in motion.

8. The horseshoe of claim 7, wherein the ratio of said narrow end length to said wide end length ranges from about 0.4 to about 0.8.

9. The horseshoe of claim 7, further comprising:
a substantially U-shaped sole, said toe member, said medial side member, and said lateral side members connected to said sole in a substantially U-shaped pattern.

10. The horseshoe of claim 9, wherein said sole comprises at least one of a toe grab and a plurality of cleats.

11. A horseshoe comprising:
a toe member;
a lateral side member;
a medial side member,
a substantially U-shaped sole, said toe member, said medial side member, and said lateral side members connected to said sole in a substantially U-shaped pattern; and
at least two hinges, wherein one of said at least two hinges is positioned on the lateral side of said horseshoe and connects said lateral side member to said toe member, the other of said at least two hinges is positioned on the medial side of said horseshoe and connects said medial side member to said toe member, each of said hinges connecting said toe member to said lateral and medial side members comprises first and second hinge members and a resilient material joining said first and second hinge members; said medial side member comprising one first hinge member, said lateral side comprising the other first hinge member, and said toe member comprising two second hinge members;

said horseshoe having a substantially U-shape and a centerline bisecting said horseshoe, a toe area spanning said centerline and proximate to said centerline, two heel areas on opposite sides of said centerline and distal from said centerline, and two quarter areas on opposite sides of said centerline and intermediate to said toe area and said heel areas; said at least two hinges positioned to allow expansion and relaxation of said horseshoe in compliance with a hoof of a horse in motion, wherein said sole comprises the same resilient material as said hinges, said resilient material of said hinges being monolithic with said resilient material of said sole.

12. The horseshoe of claim 10, wherein one of said cleats is integral with one of said hinges, thereby increasing the thickness of said hinge.

13. The horseshoe of claim 11, wherein said resilient material comprises at least one member selected from the group consisting of polyurethanes, natural rubbers, and synthetic rubbers.

14. The horseshoe of claim 7, wherein said toe member, said lateral side member, and said medial side member are substantially rigid.

15. A horseshoe comprising;
a toe member spanning a centerline of said horseshoe;
a medial side member on a medial side of said centerline and expandable attached to said toe member; and
a lateral side member positioned on a lateral side of said centerline and expandable attached to said toe member,
wherein said toe member, said medial side member and said lateral side member form a substantially U-shaped pattern and said expandable attachments are positioned relative to said centerline to allow expansion and relaxation of said horseshoe in compliance with a hoof of a horse in motion, and said expandable attachments comprise tapered hinges, said tapered hinges tapering from a wide end to a narrow end, a resilient material substantially filling said tapered hinges, wherein said narrow end has a narrow end length and is proximate to an outer edge of said horseshoe, and said wide end has a wide end length and is proximate to an inner edge of said horseshoe.

16. The horseshoe of claim 15, wherein said expandable attachments comprise only a resilient material, said expandable attachment resilient material being the only material connecting said toe member to said lateral side member and said medial member.

17. The horseshoe of claim 15, wherein said expandable attachments are positioned in quarter areas of said horseshoe.

18. The horseshoe of claim 15, further comprising:
means for permitting shaping of said horseshoe.

19. The horseshoe of claim 18, wherein said means for permitting shaping of said horseshoe comprises said toe member including a malleable material.

20. A horseshoe comprising:
a resilient substantially U-shaped sole;
a toe member connected to the sole and comprising a malleable material for permitting shaping of the horseshoe;
two side members connected to the sole; and
two tapered hinges comprising a resilient material and expandably connecting the toe member to each side member, each hinge being positioned within a quarter area of the horseshoe, the hinges tapering from a wide end to a narrow end, wherein said narrow end has a narrow end length and is proximate to an outer edge of said horseshoe, and said wide end has a wide end length and is proximate to an inner edge of said horseshoe;

the toe member and the side members further comprising a wear surface material.

21. The horseshoe according to claim 20, wherein the ratio of the narrow end gap to the wide end gap ranges from about 0.4 to about 0.8.

22. The horseshoe according to claim 20, wherein the tapered hinges comprise only a resilient material, the tapered hinge resilient material being the only material connecting the toe member to the side members.

23. The horseshoe according to claim 22, wherein the resilient material fills the volume bounded by the toe member, an adjacent side member, the inner edge and the outer edge.

24. A horseshoe comprising:
a monolithic resilient substantially U-shaped sole formed from a resilient material, the sole including a toe region, two side regions and two tapered hinges resiliently expandably connecting the toe region to the side regions, each hinge being positioned within a quarter area of the horseshoe; and
a plurality of malleable metal inserts monolithic with the resilient sole,
the two tapered hinges tapering from a wide end to a narrow end, wherein the narrow end has a narrow end length and is proximate to an outer edge of the horseshoe, and the wide end has a wide end length and is proximate to an inner edge of the horseshoe, the tapered hinges comprising only a resilient material, the tapered hinge resilient material being the only material connecting the toe region to the side regions and the tapered hinge resilient material filling the volume bounded by the toe region, an adjacent side region, the inner edge and the outer edge.

25. The horseshoe according to claim 24, wherein the malleable metal inserts comprise a wear surface.

26. The horseshoe according to claim 24, wherein one malleable insert is positioned in the toe region and a malleable insert is positioned in each side regions.

27. The horseshoe according to claim 26, wherein the toe region and the side regions are substantially rigid.

28. The horseshoe of claim 3, wherein the hinges are positioned in the quarter areas of said horseshoe.

29. The horseshoe according to claim 6, wherein the resilient material fills the volume bounded by the toe member, an adjacent side member, the inner edge and the outer edge.

* * * * *

UNITED STATES PATENT AND TRADEMARK OFFICE
CERTIFICATE OF CORRECTION

PATENT NO. : 6,497,293 B1
DATED : December 24, 2002
INVENTOR(S) : Gary M. Miller It is certified that error appears in the above-identified patent and that said Letters Patent is hereby corrected as shown below:

Column 4,
Line 64, replace "claim 1" with -- claim 7 --

Column 6,
Line 26, replace "expandable" with -- expandably --

Signed and Sealed this

Seventeenth Day of June, 2003

JAMES E. ROGAN
*Director of the United States Patent and Trademark Office*